United States Patent [19]
Ward et al.

[11] 3,928,523
[45] Dec. 23, 1975

[54] MOULDING OF SYNTHETIC PLASTICS SHEET MATERIAL

[76] Inventors: Peter Ward, 4 The Croft, Oulton, near Leeds, Yorkshire; Jack Brocklehurst, 13 Beech Wood, Woodlesford, near Leeds, both of England

[22] Filed: Dec. 26, 1973

[21] Appl. No.: 428,399

[52] U.S. Cl. .................. 264/93; 264/296; 264/313; 264/318; 425/387 R
[51] Int. Cl.² .......................................... B29C 17/04
[58] Field of Search ............ 264/89, 90, 92, 93, 94, 264/313, 296, 318; 425/388, 387 R

[56] References Cited
UNITED STATES PATENTS
3,342,915   9/1967   Wanderer .............................. 264/92
3,737,498   6/1973   Jackson .............................. 264/318

FOREIGN PATENTS OR APPLICATIONS
1,344,611   10/1963   France .................................. 264/94

Primary Examiner—Jan H. Silbaugh
Attorney, Agent, or Firm—Wolf, Greenfield & Sacks

[57] ABSTRACT

A method of moulding heated, soft thermoplastics sheeting, wherein the sheet partially is clamped by co-operating mould parts to form part of a component and the remainder of the component is formed by thermoforming. The mould is of special construction, enabling moulding partially by clamping and partially by thermoforming.

1 Claim, 4 Drawing Figures

MOULDING OF SYNTHETIC PLASTICS SHEET MATERIAL

This invention relates to the moulding of heat softenable synthetic plastics sheet material.

A wide variety of synthetic plastics sheet materials are moulded, the material depending to a very large extent upon the use to which the moulded component is to be put, but commonly used materials are polystyrene and polyvinyl chloride; the polyolefins e.g. polyethylene and polypropylene, on the other hand are of soft rubbery texture to the touch, as is plasticised polyvinyl chloride, and because of this, and also because they are expensive tend not to be used for moulding from sheet form.

Furthermore, the invention has particular reference to the moulding of shallow trays and lids of the type used as or for domestic smallware containers, such as containers for foodstuffs. One common application is a lid for the tub containers in which, for example, margarine or butter is sold.

Such lids have heretofore been made for example in polyethylene on the one hand, and polystyrene on the other hand. The lids made in polyethylene have heretofore been injection moulded, whereas the lids in polystyrene have been thermoformed. The former technique is to inject the plastics material in fluent state into a mould cavity corresponding to the shape of the lid (or other component to be produced), whereas in the latter technique, a sheet of the plastics material is softened by heat and then is shaped round a mould by fluid e.g. air pressure and/or vacuum. Sometimes a plug is used to assist the sheet in being deflected into a mould cavity. Thermoforming is the more desirable, because the tooling is much cheaper than the moulds required for injection moulding, but polyethylene, and many other plastics materials are less suitable for thermoforming as they do not mould with sufficient precision round the mould, and the moulded component is not a sufficiently accurate reproduction of the mould. On the other hand, polystyrene and polyvinyl chloride mould completely satisfactorily by thermoforming techniques.

In relation to lids for domestic tubs for foodstuffs, there is a market for lids of polyethylene, polypropylene and other plastics sheet materials, which do not theremoform very well because they do have the advantages of good handlability and feel, and in general are less permeable to moisture which is of importance in some applications. Further, such lids have the characteristic considered by some to be desirable, that they can in lid form, be peeled gradually off the tub which they close. Moreover at least the polyolefins are relatively cheap plastics materials, in comparison to rigid polyvinyl chloride which is a material widely used for injection moulding.

We aim to provide a method of moulding synthetic plastics sheet material which can be applied with more or less equal effectiveness with any plastics sheet material which can be softened by heat and then moulded. The mouldings may be for example lids or shallow drawn trays or containers. The method of the invention does not require the use of injection moulding techniques.

According to the present invention, there is provided a method of moulding heat softenable, synthetic plastics sheet material, wherein the material is softened by heat and the moulded component is defined partly by clamping the soft sheet between co-operating mould parts and the remainder is formed by thermoforming.

By using the combination of a mechanical forming and thermoforming, it is possible to mould any thermoformable synthetic plastics sheet material satisfactorily, because the parts of the component which are more difficult to mould satisfactorily by thermoforming, can be mechanically moulded whilst the easier parts to mould can be moulded by thermoforming. The invention is particularly suitable for the moulding of components having "parallel" or "negative" angles in their walls. Positive, negative and parallel are applied to wall regions of containers, trays, lids or the like having a base and an upstanding wall or flange, and describe regions of the wall or flange which in an upwards direction from the base, and in relation to an axis normal to the base, diverge, converge or are parallel. Where a component has negative or parallel angle wall regions, complete mechanical forming would be very expensive, in view of the complicated nature of the tooling, and the present invention has particular advantage in such cases.

In a preferred method, a tub lid is formed by mechanically forming the base and surfaces parallel thereto, and by thermoforming the flange, including a de-nesting ring having a negative angle wall region.

The invention also provides a component moulded according to the method of the invention, and a mould for use in the method.

An embodiment of the present invention will now be described, by way of example, with reference to the accompanying drawing, wherein.

Figure 1:
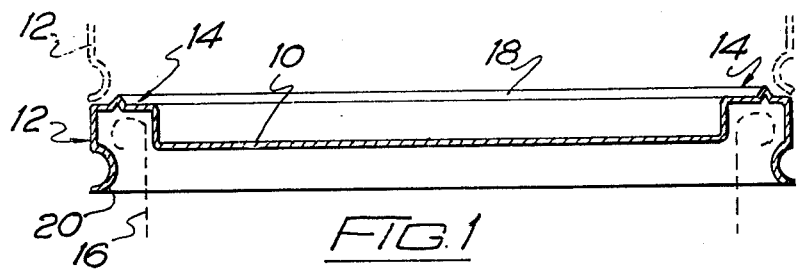
FIG. 1 is a cross-sectional elevation of a lid for a domestic margarine (or other foodstuff) tub.

The lid shown in FIG. 1 is for a domestic tub for holding foodstuff such as margarine and in this example the lid is made of polyethylene or polypropylene and is of circular configuration. FIG. 1 is a cross sectional view of this lid and it will be seen to have a base 10 and a flange 12. A stepped formation 14 between the base 10 and flange 12 is to create a recess for the reception of the top rim of the tub, which is illustrated in FIG. 1 in dotted lines and by numeral 16.

Formation 14 has an upstanding bead 18 whilst the flange 12 has an inwardly directed de-nesting ring 20. When lids are stacked one on top of the other, the de-nesting ring 20 of the superposed ring co-operates with the upstanding bead 18 of the lid located thereunderneath to prevent lateral movement between the stacked lids. FIG. 1 also shows in dotted lines, the flange 12 of a superposed lid arranged in nested relationship with the illustrated lid.

Figure 2:
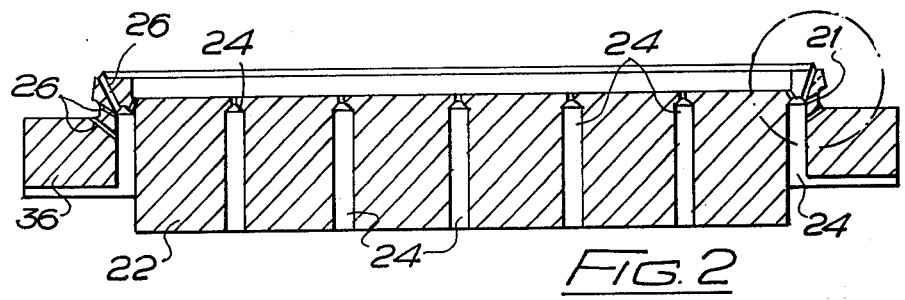
FIG. 2 is a sectional elevation of a mould plug used in the manufacture of the lid of FIG. 1.
Figure 2A:
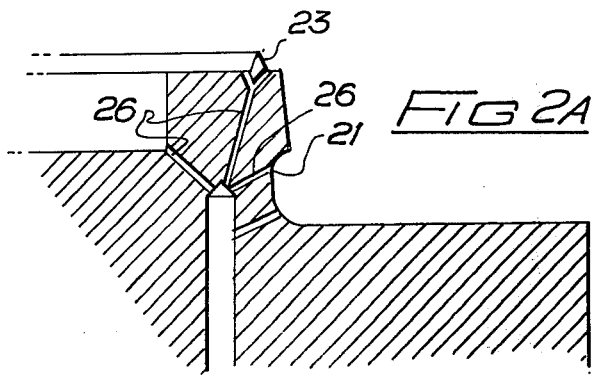
FIG. 2A is an enlarged sectional view of the detail ringed in FIG. 2.
Figure 3:
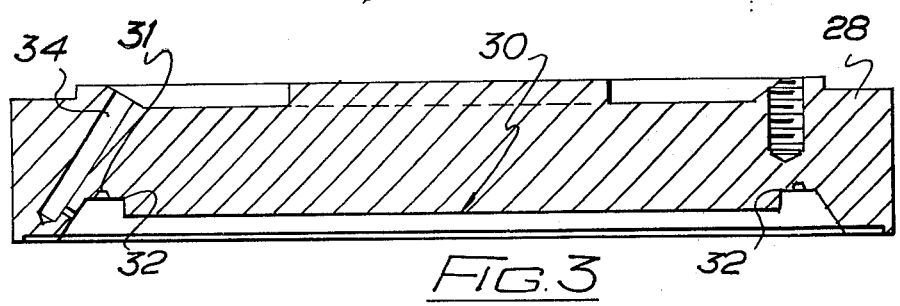
FIG. 3 is a sectional elevation of the mould clamp which, together with the mould plug of FIG. 2 and 2A, defines the mould cavity for lids, such as the lid shown in FIG. 1.

The mould for producing the lid of FIG. 1 is in two parts illustrated respectively by FIG. 2 and FIG. 2A, and FIG. 3. It can be seen clearly from these figures that the mould parts of FIGS. 2 and 3 co-operate, the FIG. 3 part being located above the FIG. 2 part to define the mould cavity for the lid of FIG. 1.

The mould part illustrated in FIG. 2 is in fact a mould plug of circular form and is constructed of an aluminium alloy. The plug is illustrated by numeral 22. The shaping of the plug defines the complete inner surface of the lid shown in FIG. 1 and passages 24 in the mould plug 22 lead to the surface which defines the inner surface of lid 10 by a small lead passage 26. It is noted that these small passages 26 lead to all areas of the mould plug surface to prevent the trapping of air between the plastic sheet when it is moulded and the surface of the mould plug 22 to which it is pressed.

FIG. 2A shows in enlarged scale, the contour of the mould plug for producing the corner formation 14 and the flange 12 of the lid shown in FIG. 1. The upstanding rib 23 for producing bead 18 is noticed as being of inverted V section and the undercut groove 21 for producing the de-nesting ring 20 will also be noted.

The mould part of FIG. 3 can be described as a clamp insofar as in use it is moved into clamping relationship with the mould plug 22. The clamp of FIG. 3 is referenced by numeral 28 and the undersurface is shaped to suit the surface of the mould plug 22 with which it co-operates. In this respect, there is a central disc portion 30 for producing the base 10 of the lid of FIG. 1 and also a step 32 for producing formation 14. There is a groove 31 for the reception of bead 18. However, the clamp 28 is not shaped to correspond to the outer surface of flange 12 of the lid which it is to mould, as this flange will in fact be produced by thermoforming. To this end, the clamp 28 is provided with feed passages 34 which lead from the top surface thereof to a space which will be exterior to the plastics sheet material which will eventually define flange 12 during the moulding operation.

In one example of the invention, in the production of a lid, i.e. the lid of FIG. 1, the clamp 28 will be in exact superposed relationship to the plug 22 although these will be spaced apart to allow the positioning therebetween of a 40 thous. thick sheet of low density polyethylene or polypropylene which has been heated to soften same. In this connection, the sheet may be heated to approximately 160°C or 150°C which are respectively close to the de-formable points of polyethylene and polypropylene. With the sheet in this soft mouldable state, the clamp 28 and plug 22 are brought together into clamping relationship so that they together mechanically shape the polyethylene sheet into the form shown in FIG. 1, with the exception of the production of flange 12, because clamp 28 does not structurally define the outer surface of flange 12. In this clamping operation, it is possible to squeeze the soft sheet to reshape same, depending upon the clearances between the molded parts. For example, the inverted V rib 23 of mould plug 22 could be omitted, and the formation 14 could be formed by squeezing soft plastics material into the groove in clamp 28 by the clamping action.

Flange 12 is in fact shaped by thermoforming in that air under pressure is introduced through passages 34 to press the flange defining plastics material onto the flange defining portion of the plug 22 whereby the entire lid of FIG. 1 is defined. The moulding procedure takes place very quickly and normally the mechanical clamping will precede the thermoforming because the seal for the thermoforming is defined in fact by the surrounding surface of clamp 28 which presses upon a surrounding ring 36 of plug 22. It is appreciated that since mechanical moulding of part of the lid is involved, then the dimensioning of the tolerances between mould parts one in relation to the other must be accurately maintained for the production of a satisfactory product, and where desired, the squeezing of the plastics material as explained above. However, at least the same type of tolerances are required in injection moulding techniques.

In the formation of a component such as the lid illustrated in FIG. 1 having a flat area i.e. the base defined within the perimeter of the component, there may be a slight difficulty with certain synthetic plastics sheet materials in that the surface flatness may not be particularly good and when the sheet is pressed between flat faces of moulding dies there is a tendency for ridges and valleys i.e. the irregularities in the sheet thickness to show up in the finished product. This can be unsightly and in some cases unacceptable. In order to overcome this difficulty, there may be provided a layer of flexible compressible material on the flat face of one or other of the die section 22, 28 so that the flexible compressible material will follow the synthetic plastic sheet contour during the moulding operation thereby preventing the formation of visible irregularities in the moulded surface of the component.

The flexible material may be for example a synthetic rubber and woven cloth backing laminate, the cloth backing being closer to the die surface than the rubber so that indeed the rubber contacts the synthetic plastics component during the moulding thereof.

The compressible layer can of course be of other material and it can be attached to the die in any suitable manner such as by adhesives. Indeed, in some cases it may not require to be physically connected to the die but simply to be interposed between the synthetic plastics sheet and the die surface.

In the example described, the flexible layer would be located adjacent the surface 30 of the die 28 and such flexible layer would contact the upper surface of the central circular portion 10 of the lid moulded in the forming operation.

The mould tooling as described for the production of the lid of FIG. 1 is, in comparison with injection moulding tooling, extremely cheap, and test results have been very encouraging insofar as a satisfactory product moulded in any heat softenable plastics can be obtained using this moulding technique.

Whilst we can envisage that the technique of the present invention would not appear to be limited, in our own field, the packaging of domestic items in plastics containers and lids therefor, we think that the minimum thickness of sheet we would use would be 10 thousandths of an inch, and the maximum 60 thousandths of an inch.

The method of heating the synthetic plastics sheet material prior to moulding may be any suitable, although we have used infra-red heating, in advance of the moulding operation, with good effect.

The pressure of the air supplied to form the flange 12 was in the example quoted 80 lbs. per sq. inch, although this will depend upon the thickness of the plastic sheet being moulded and the shape into which it is to be moulded by the pressure forming part of the operation.

The moulded component can either be allowed to cool or force cooled, for example by circulating cooling fluid through cooling passages formed on the mould parts, before the mould parts are separated and it is usually necessary to reduce the temperature by at least 10°C – 15°C before opening the mould parts.

It is believed that at least with the example described another advantage will be obtained by this invention, and this advantage concerns the stability of the product produced by the technique. In particular, because the component is being held firmly between clamped mould parts whilst it is cooling or being cooled, the dimensional stability of the resulting article will be better than is normally experienced with articles of synthetic plastics material. The improved dimensional stability achieved for example in relation to a lid such as illustrated in FIG. 1 gives better flatness of the base and the lid in general i.e. less warping.

Furthermore, in moulding in particular polyolefin material, a large amount of heat is required to soften the material and a large amount of heat is required to be removed in cooling the material after moulding. Because of this, the cycle time in moulding a component in a polyolefin material from the commencement of heating to the attainment of the atmospheric temperature for the moulded component tends to be rather long. We believe that the present invention can reduce this cycle time because it involves mechanical forming and the temperature to which the polyolefin material requires to be heated may be slightly less and moreover as it is cooled whilst it is held clamped and may be forced cooled by circulating cooling medium through the mould parts, the cycle time may be considerably reduced.

Generally speaking, it is felt that the main application for the invention will be in formation of lids such as illustrated in FIG. 1 and/or shallow drawn trays but because the technique can be used on a wide range of synthetic plastics materials, it is believed that the invention has wider application.

We claim:

1. The method of molding lids from thermoplastic heat softened sheet material to form a lid having a raised location ring thereon and a downturned peripheral annular flange having an inwardly protruding bead therearound, the method comprising the steps of
   1. clamping a portion of the heat softened thermoplastic sheet material in a flat plane between opposed annular clamping surfaces of a pair of dies to distort the thermoplastic material out of said plane into a groove in one of said surfaces to form a raised location ring encircling a center portion of the lid, and
   2. forming on the lid a beaded peripheral flange that extends from said clamping plane in a direction opposite to that in which the raised location ring extends from said plane by causing the peripheral portion of the sheet material extending outside the clamped portion to be forced by air pressure against an undercut contoured surface in one of the dies to form an inwardly protruding bead around the downturned peripheral flange of the lid.

* * * * *